(12) United States Patent
Noda (10) Patent No.: US 8,884,231 B2
(45) Date of Patent: Nov. 11, 2014

(54) RADIATION DETECTOR

(75) Inventor: Kazuhiro Noda, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 14 days.

(21) Appl. No.: 13/290,583

(22) Filed: Nov. 7, 2011

(65) Prior Publication Data

US 2012/0112075 A1 May 10, 2012

(30) Foreign Application Priority Data

Nov. 8, 2010 (JP) ................................. 2010-249575
Oct. 27, 2011 (JP) ................................. 2011-236295

(51) Int. Cl.
*G01T 1/20* (2006.01)

(52) U.S. Cl.
CPC .................. *G01T 1/2002* (2013.01)
USPC ..................................................... 250/361 R

(58) Field of Classification Search
USPC ..................................................... 250/361 R
See application file for complete search history.

(56) References Cited

U.S. PATENT DOCUMENTS

| | | | |
|---|---|---|---|
| 5,153,438 A * | 10/1992 | Kingsley et al. | 250/370.09 |
| 6,541,774 B1 * | 4/2003 | DeJule et al. | 250/370.11 |
| 6,642,524 B2 * | 11/2003 | Vafi et al. | 250/370.11 |
| 2003/0001100 A1 * | 1/2003 | Dejule | 250/370.11 |
| 2003/0107001 A1 | 6/2003 | Baumgartner et al. | |
| 2005/0285045 A1 * | 12/2005 | Baumgartner et al. | 250/370.11 |
| 2006/0038131 A9 * | 2/2006 | Homme et al. | 250/370.11 |
| 2006/0108683 A1 * | 5/2006 | Takeda | 257/723 |
| 2007/0051896 A1 * | 3/2007 | Okada et al. | 250/370.11 |
| 2008/0302970 A1 * | 12/2008 | Fujieda et al. | 250/370.11 |
| 2011/0198505 A1 * | 8/2011 | Ishida et al. | 250/363.01 |

FOREIGN PATENT DOCUMENTS

| | | |
|---|---|---|
| JP | 09230054 A | 9/1997 |
| JP | 2002-148343 A | 5/2002 |
| JP | 2006052979 A | 2/2006 |
| JP | 2008064763 A | 3/2008 |

OTHER PUBLICATIONS

Notice of Reasons for Rejection, dated Nov. 6, 2012, issued in corresponding JP Application No. 2011-236295, 4 pages in English and Japanese.
The First Office Action, dated Aug. 22, 2013, issued in corresponding Chinese Application No. 201110345070.7, 12 pages in English and Chinese.
Chinese Office Action for corresponding Application No. 201110345070.7 issued Mar. 26, 2014, 13 pages in Chinese and English.
The Third Office Action, dated Jul. 7, 2014, issued in corresponding CN Application No. 201110345070.7, 9 pages in English and Chinese.

* cited by examiner

*Primary Examiner* — Christine Sung
(74) *Attorney, Agent, or Firm* — Sughrue Mion, PLLC (57) ABSTRACT

There is provided a radiation detector including: a support body; a scintillator layer that is deposited further to the inside than outside edges of the support body and that converts incident radiation into light; a photo detector plate that converts light emitted from the scintillator layer into charge and has a different linear expansion coefficient to that of the support body, the photo detector plate being adhered to the scintillator layer so as to form a gap between the photo detector plate and the support body; and a sealing layer of a resilient body that is poured into the gap and that covers a side face of the scintillator layer, such that a film thickness at the center portion of the sealing layer is thinner than a film thickness of the sealing layer at the support body side edges and at the photo detector plate side edges.

19 Claims, 11 Drawing Sheets

RADIATION DETECTOR

CROSS-REFERENCE TO RELATED APPLICATION

This application is based on and claims priority under 35 USC 119 from Japanese Patent Applications No. 2010-249575 filed on Nov. 8, 2010 and No. 2011-236295 filed on Oct. 27, 2011, the disclosures of which are incorporated by reference herein.

BACKGROUND

1. Technical Field

The present invention relates to a radiation detector.

2. Related Art

Radiation detectors are recently being applied with Flat Panel Detectors (FPD) disposed with a radiation sensitive layer over a Thin Film Transistors (TFT) active matrix board and capable of converting radiation directly into digital data. Such radiation detectors have the advantage of enabling immediate image and video image checking to be performed. Radiation detectors are available with various types of radiation conversion, such as an intermediate conversion type in which radiation is first converted into light by a scintillator and then converted into accumulated charge by a semiconductor layer such as a photodiode, and a direct conversion type in which radiation is directly converted into charge by a semiconductor layer such as of amorphous selenium. Various types of material may be employed in the semiconductor layers for both types of radiation detector.

Radiographic imaging apparatuses (referred to below as electronic cassettes) installed with such radiation detectors are being put into practice to store radiographic imaging data output from the radiation detectors.

Due to their portability such electronic cassettes can be flexibly utilized on immobile patients since imaging can be accomplished with a patient still lying on a stretcher or bed, and such electronic cassettes enable the imaging location to be adjusted simply by changing the position of the electronic cassette.

Examples of radiation detectors installed in electronic cassettes include radiation detectors with a support body for vacuum depositing a radiation sensitive layer (referred to below as a scintillator layer) on, the scintillator layer for converting input radiation to light, and a TFT active matrix board (referred to below as a photo detector plate) for converting light emitted by the scintillator layer into charge attached to the scintillator layer.

A sealing layer is needed between the support and the photo detector plate to prevent moisture penetration to the side faces of the scintillator layer when the scintillator layer is configured by a deliquescent material, as described in Japanese Patent Application Laid-Open (JP-A) No. 2002-148343.

However, in JP-A No. 2002-148343, the linear expansion coefficients (thermal expansion rates) of the photo detector plate and the support body differ from each other due to the photo detector plate configuring the radiation detector being formed from glass, and the support body being configured from glass and aluminum. The photo detector plate and the support body hence warp towards the outside face directions due to thermal expansion occurring with fluctuations in the internal temperature of the electronic cassette. Warping of the support body is particularly significant when the whole of the support body is configured from aluminum, although this aspect is not referred to in JP-A No. 2002-148343.

An issue hence arises of the sealing layer separating with an accompanying deterioration in moisture penetration prevention ability unless the sealing layer is able to conform to such warping.

While also not referred to in JP-A No. 2002-148343, sometimes the support body is covered in a protective layer in order to prevent corrosion by the material configuring the scintillator layer of a support body formed from a material such as aluminum. An issue arises in such cases of separation between the sealing layer and the support body protective layer it is adhered to due to warping of the support body and accompanying deterioration in moisture penetration prevention ability.

SUMMARY

In consideration of the above circumstances the present invention is directed towards provision of a radiation detector capable of maintaining moisture penetration prevention ability to the scintillator layer.

A first aspect of the present invention provides a radiation detector including:

a support body;

a scintillator layer that is deposited further to the inside than outside edges of the support body and that converts incident radiation into light;

a photo detector plate that converts light emitted from the scintillator layer into charge and has a different linear expansion coefficient to that of the support body, the photo detector plate being adhered to the scintillator layer so as to form a gap between the photo detector plate and the support body; and a sealing layer of a resilient body that is poured into the gap and that covers a side face of the scintillator layer, such that a film thickness at the center portion of the sealing layer is thinner than a film thickness of the sealing layer at the support body side edges and at the photo detector plate side edges.

Note that cases in which the sealing layer covers a portion of the side faces of the scintillator layer are included as well as cases in which the sealing layer covers all of the side faces of the scintillator layer.

According to such a configuration, since a film thickness at the center portion of the sealing layer is thinner than a film thickness of the sealing layer at the support body side edges and at the photo detector plate side edges, the sealing layer more readily performs resilient deformation than in a case where the thickness at the center portion of the sealing layer is not thinner, enabling the sealing layer to follow the support body and the photo detector plate towards the outside face directions even though warping occurs with temperature changes due to thermal expansion of the support body and the photo detector plate having different linear expansion coefficients.

Furthermore, the film thickness of the sealing layer at the support body side edges and the photo detector plate side edges is thicker than the film thickness at the center portion of the sealing layer and hence the adhering surface area between the sealing layer and the support body and the photo detector plate is increased, enabling sufficient cohesive force to be achieved.

Accordingly the sealing layer can be suppressed from separating and other members adhered to the sealing layer can be suppressed from similar separation that would exposed them from the whole, or a portion, of the side faces of the scintillator layer, enabling the moisture penetration prevention ability to the scintillator layer to be maintained.

A second aspect of the present invention provides the radiation detector of the first aspect further including a first protection layer provided between the side face of the scintillator layer and the sealing layer.

According to such a configuration, the moisture penetration prevention ability to the scintillator layer can be raised.

A third aspect of the present invention provides the radiation detector of the second aspect, wherein:

the scintillator layer has a pillar shaped structure; and all surfaces of the support body are covered by a second protection layer.

According to such a configuration, the support body is not eroded when the scintillator layer is being formed due to the second protection layer covering the whole face of the support body.

The sealing layer here is adhered to the second protection layer, however tensional force is not readily transmitted due to the sealing layer following the warping of the support body and the photo detector plate, resulting in the second protection layer not separating from the support body.

A fourth aspect of the present invention provides the radiation detector of the first aspect, wherein the outer peripheral face of the sealing layer has an indented profile.

According to such a configuration, the sealing layer readily resiliently deforms towards the peripheral direction outside.

A fifth aspect of the present invention provides the radiation detector of the first aspect further comprising a tube disposed between the scintillator layer and the sealing layer.

The adhering surface area between the side faces of the scintillator layer and the sealing layer is reduced by disposing the tube between the scintillator layer and the sealing layer, enabling the sealing layer to be readily deformed.

A sixth aspect of the present invention provides the radiation detector of the first aspect further comprising an air layer formed between the scintillator layer and the sealing layer.

The adhering surface area between the sealing layer and the side faces of the scintillator layer is reduced by forming the air layer between the scintillator layer and the sealing layer, enabling the sealing layer to be readily deformed.

A seventh aspect of the present invention provides the radiation detector of the third aspect wherein the post curing Young's modulus of the resilient body is from 0.1 MPa to 100 MPa.

According to such a configuration, the first protection layer and the second protection layer can reliably be prevented from separating when the support body and the photo detector plate warp due to thermal expansion.

According to the present invention, a radiation detector that can maintain moisture penetration prevention ability to the scintillator layer can be provided.

BRIEF DESCRIPTION OF THE DRAWINGS

Exemplary embodiments of the present invention will be described in detail based on the following figures, wherein.

DETAILED DESCRIPTION

First Exemplary Embodiment

Specific explanation follows regarding a radiation detector according to a first exemplary embodiment of the present invention, with reference to the accompanying drawings. In the drawings the same reference numerals are appended where appropriate to members (configuration elements) having the same or similar function and further explanation is omitted.

Overall Configuration of Radiographic Imaging Apparatus

Explanation follows regarding an electronic cassette serving as an example of a radiographic imaging apparatus installed with a radiation detector according to the first exemplary embodiment of the present invention.

An electronic cassette is a portable radiographic imaging apparatus that detects radiation that has passed through an imaging subject from a radiation source, generates image data of a radiation image representing the radiation detected, is capable of storing the generated image data, and a specific example is configured as described below. Note that a configuration that does not store the generated image data may be employed for the electronic cassette.

Figure 1:
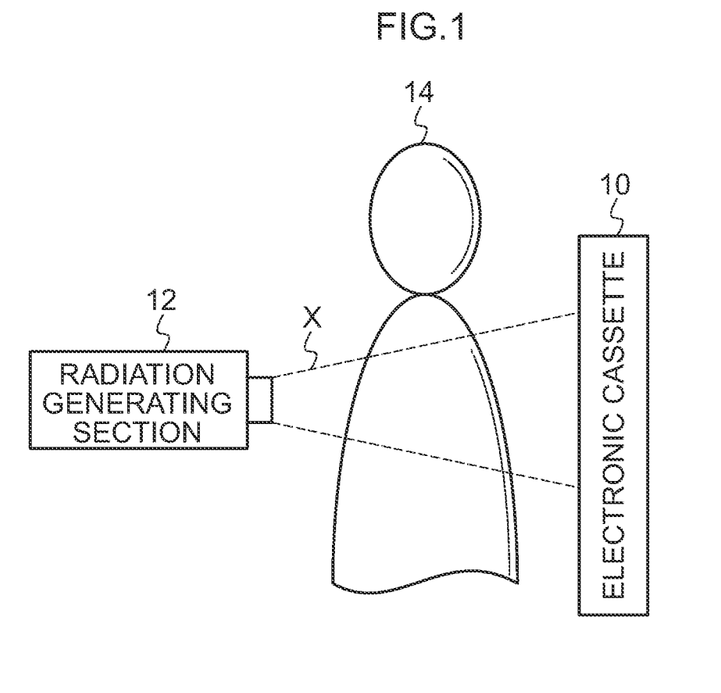
FIG. 1 is a schematic diagram illustrating placing of an electronic cassette during radiographic image capture.

FIG. 1 is a schematic diagram illustrating placing of the electronic cassette during radiographic image capture.

An electronic cassette 10 is disposed with a separation to a radiation generating section 12 serving as a radiation source emitting radiation X during radiographic image capture. A patient 14 acting as an imaging subject is positioned at an imaging position between the radiation generating section 12 and the electronic cassette 10. When instructed to perform radiographic imaging, the radiation generating section 12 emits radiation X at a radiation amount in accordance with previously provided imaging conditions. The radiation X emitted from the radiation generating section 12 picks up image data on passing through the patient 14 positioned at the imaging position and is then irradiated onto the electronic cassette 10.

Figure 2:
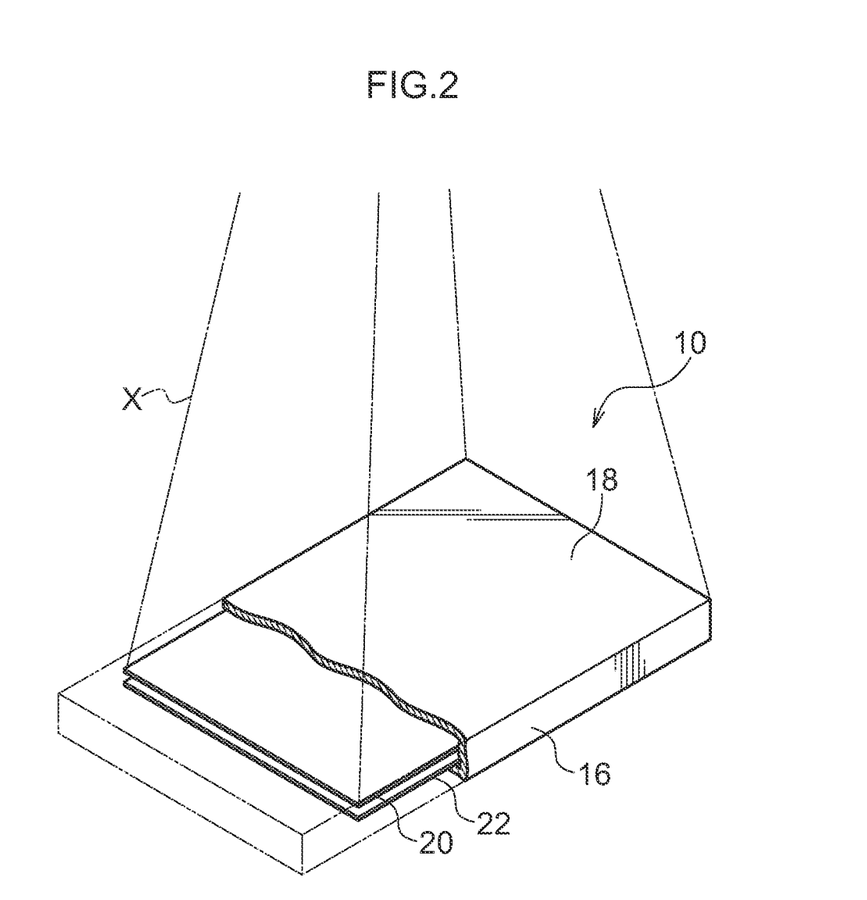
FIG. 2 is schematic perspective view illustrating the internal structure of an electronic cassette.

FIG. 2 is a schematic perspective view illustrating an internal configuration of the electronic cassette 10.

The electronic cassette 10 is equipped with a flat plate shaped casing 16 having a particular thickness and formed from a material that allows radiation X to pass through. Inside the casing 16 are provided, in sequence from an irradiation face 18 side of the casing 16 onto which the radiation X is irradiated, a radiation detector 20 for detecting radiation X that has passed through the patient 14, and a control board 22 for controlling the radiation detector 20.

Figure 3:
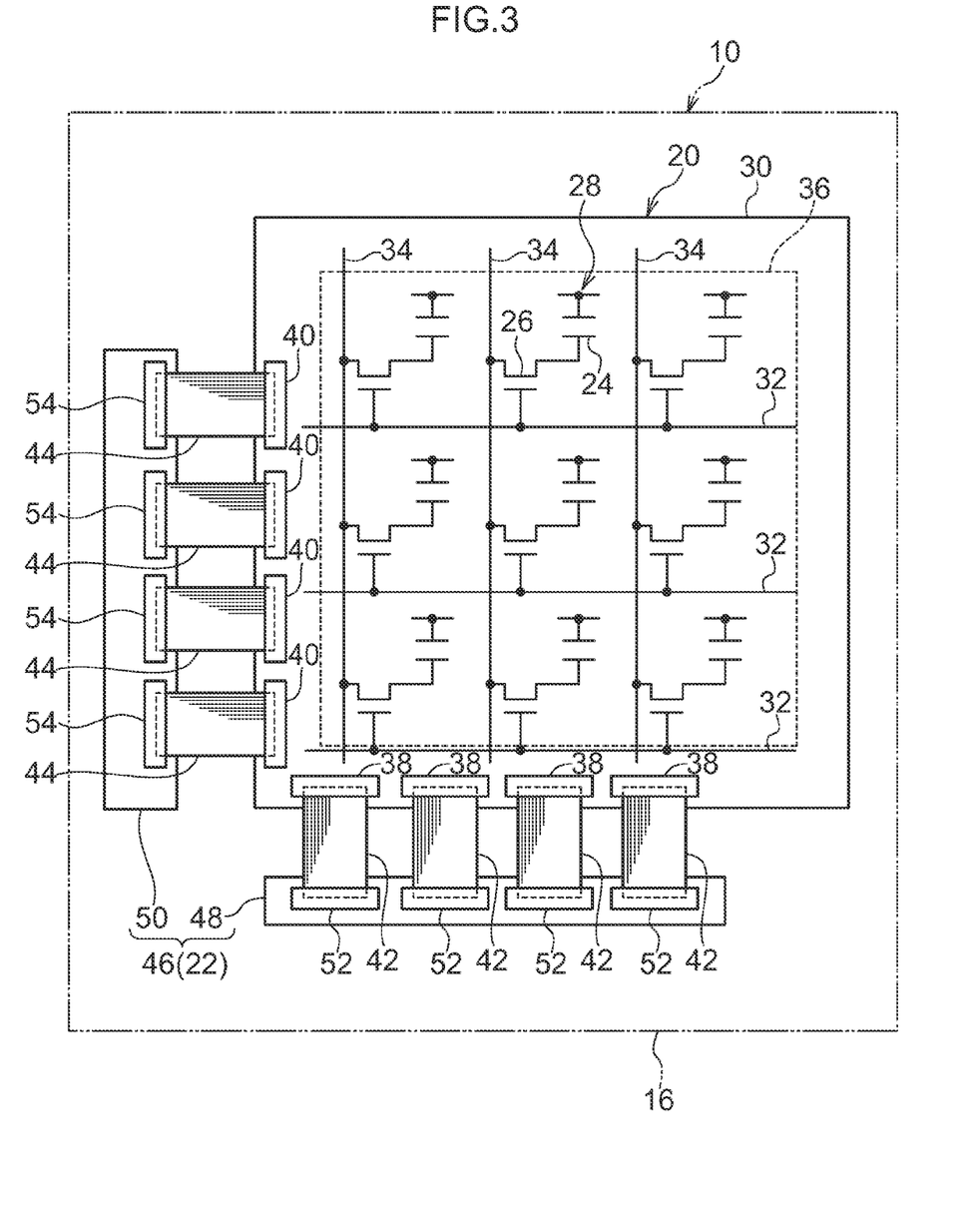
FIG. 3 is a circuit diagram of an electronic cassette.

FIG. 3 is a circuit diagram of the electronic cassette 10.

The radiation detector 20 includes a photo detector plate 30 provided with a two dimensional array of plural pixels 28. Each of the pixels 28 is configured with a sensor section 24, provided with an upper electrode, a semiconductor layer, and a lower electrode for receiving light and accumulating charge, and a Thin Film Transistors (TFT) switch 26 for reading out charge accumulated in the sensor section 24.

The photo detector plate 30 is provided with plural mutually intersecting scan lines 32 for switching the TFT switches 26 ON and OFF, and plural signal lines 34 for reading out charge accumulated in the sensor sections 24.

The radiation detector 20 according to the first exemplary embodiment of the present invention has a scintillator layer 36 attached to the front face of the photo detector plate 30.

The scintillator layer 36 converts irradiated radiation X, such as X-rays, into light. Each of the sensor sections 24 receives light incident from the scintillator layer 36 and accumulates charge.

When any of the TFT switches 26 connected to each of the signal lines 34 is switched ON an electrical signal (image signal) representing a radiation image flows in the respective signal lines 34 according to the amount of charge accumulate in the sensor sections 24.

Plural individual line connectors 38 are provided to the radiation detector 20 in a row at one signal line 34 direction end, and plural individual connectors 40 are provided to the radiation detector 20 at one scan line 32 direction end. Each of the signal lines 34 is connected to one of the connectors 38 and each of the scan lines 32 is connected to one of the connectors 40.

One end of a flexible cable 42 is electrically connected to each of the connectors 38. One end of a flexible cable 44 is also electrically connected to each of the connectors 40. The flexible cables 42 and the flexible cables 44 are connected to the control board 22.

The control board 22 includes a control section 46 for controlling image capture operation by the radiation detector 20 and controlling signal processing on the electrical signal flowing in each of the signal lines 34. The control section 46 includes a signal detection circuit 48 and a scan signal control circuit 50.

The signal detection circuit 48 is provided with plural individual connectors 52. The connectors 52 are electrically connected to the other ends of the flexible cables 42. The signal detection circuit 48 is installed with an amplification circuit for each of the signal lines 34 in order to amplify input electrical signals. This configuration detects the amount of charge accumulated in each of the sensor sections 24 as data for each of the pixels 28 configuring an image by detecting the amplification circuit amplified electrical signals input by each of the signal lines 34.

The scan signal control circuit 50 is provided with plural individual connectors 54. The connectors 54 are electrically connected to the other ends of the flexible cables 44 referred to above. The scan signal control circuit 50 is capable of outputting control signals to each of the scan lines 32 for switching the TFT switches 26 ON and OFF.

In order to perform radiographic image capture using such a configuration radiation X is irradiated through the patient 14 and onto the radiation detector 20. The irradiated radiation X is converted into light by the scintillator layer 36 and then illuminated onto the sensor sections 24. Each of the sensor section 24 receives the illuminated light from the scintillator layer 36 and accumulates charge.

When reading an image an ON signal (+10 to 20V) is applied through the scan lines 32 in sequence from the scan signal control circuit 50 to the gate electrodes of the TFT switches 26 of the radiation detector 20. The TFT switches 26 of the radiation detector 20 are accordingly switched ON in sequence and electrical signals flow out along the signal lines 34 according to charge amounts accumulated in the sensor sections 24. The signal detection circuit 48 detects the amount of charge accumulated in each of the sensor section 24 as data for each of the pixels 28 configuring an image according to the electrical signals flowing out along the signal lines 34 of the radiation detector 20. Image data is accordingly obtained representing an image expressing the radiation irradiated onto the radiation detector 20.

Electronic Cassette 10 Configuration

Figure 4:
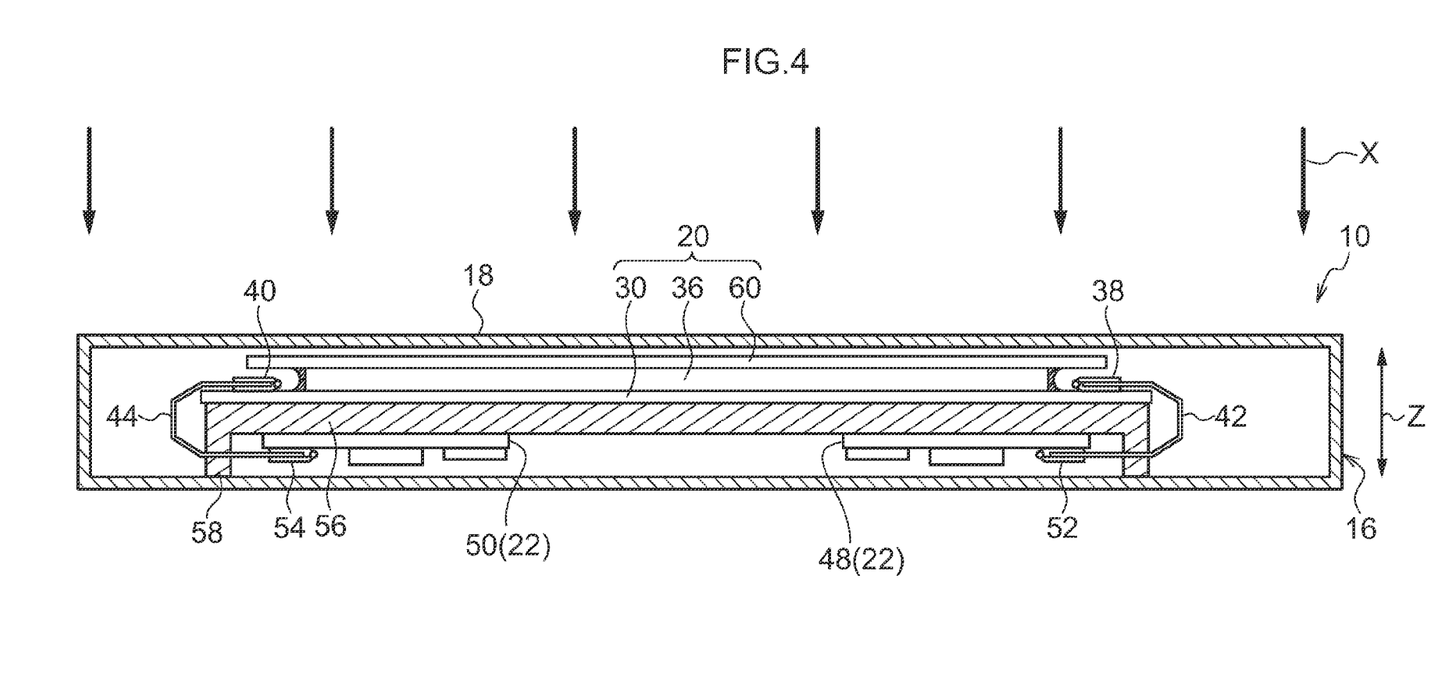
FIG. 4 is a cross-section illustrating a cross-sectional configuration of an electronic cassette.

More specific explanation follows regarding configuration of the electronic cassette 10. FIG. 4 is a cross-section illustrating a cross-sectional configuration of the electronic cassette 10.

As shown in FIG. 4, in sequence from the irradiation face 18 side onto which the radiation X is irradiated the electronic cassette 10 is installed inside the casing 16 with the control board 22, a base 56 and the radiation detector 20 according to the first exemplary embodiment of the present invention.

The base 56 is mounted on the bottom face inside the casing 16 using support legs 58. The control board 22 is fixed to the bottom face of the base 56. The control board 22 is connected to the radiation detector 20 through the flexible cables 42 and the flexible cables 44.

For ease of explanation "up" will be used to indicate the direction from the control board 22 side towards the radiation detector 20 side in exemplary embodiments, and "down" will be used to indicate the direction from the radiation detector 20 side towards the control board 22 side, however these definitions are merely adopted where appropriate to clarify positional relationships and place no limitations on the actual directions in the following explanation.

The radiation detector 20 according to the first exemplary embodiment of the present invention is mounted to the top face of the base 56.

The radiation detector 20 according to the first exemplary embodiment of the present invention is formed in a rectangular flat plate shape and detects a radiation image representing the radiation X that has passed through a subject, as described above. In the present exemplary embodiment warping also occurs towards the outside face directions Z due to thermal expansion accompanying changes in temperature within the radiation detector 20.

The radiation detector 20 is principally configured by the photo detector plate 30 connected to the other ends of the flexible cables 42 and the flexible cables 44, the scintillator layer 36 applied to the photo detector plate 30, and a vacuum deposition support plate 60 of the scintillator layer 36 facing towards the top plate of the casing 16.

Specific explanation follows regarding configuration of the radiation detector 20.

Radiation Detector 20 Configuration

Figure 5:
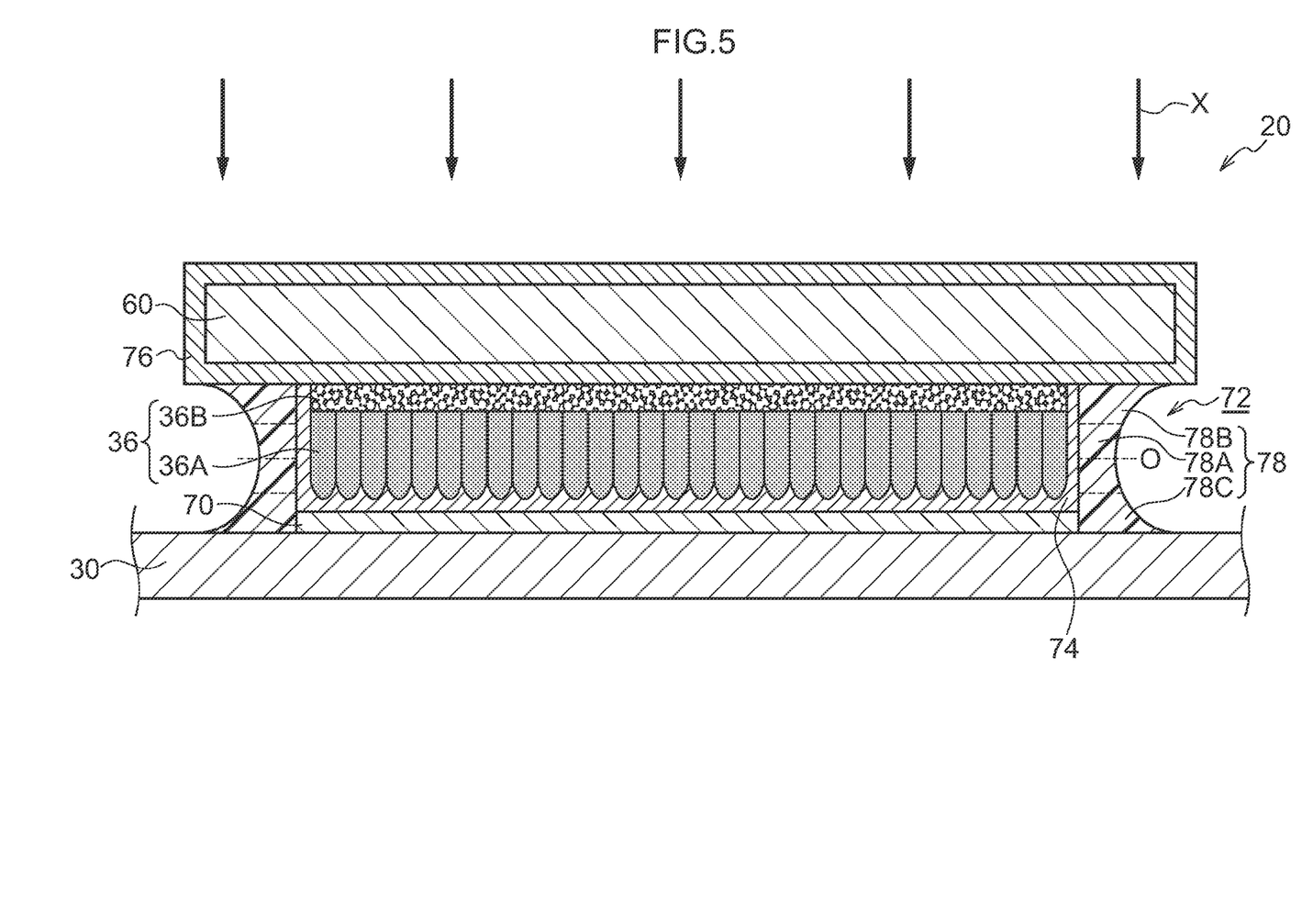
FIG. 5 is a cross-section illustrating a cross-sectional configuration of a radiation detector according to a first exemplary embodiment of the present invention.

FIG. 5 is a cross-section illustrating a cross-sectional configuration of a radiation detector 20 according to the first exemplary embodiment of the present invention.

The photo detector plate 30 is mounted on the top face of the base 56, and is configured with the TFT switches 26 and the sensor sections 24 formed on a support plate.

There is no particular limitation to the support plate material for the photo detector plate 30 as long as there is a difference between its thermal expansion coefficient and the thermal expansion coefficient of the vacuum deposition support plate 60.

Examples of support plate materials of the photo detector plate 30 include, for example, inorganic materials such as YSZ (yttrium-stabilized zirconia) or glass; and organic materials, such as saturated polyester resins, polyethylene terephthalate (PET) resins, polyethylene naphthalate (PEN) resins, polybutylene terephthalate resins, polyethylene, poly cycloolefines, norbornene resins, poly (chlorotrifluoroethylene), cross-linking fumaric acid diester resins, polycarbonate (PC) resins, polyestersulfone (PES) resins, polysulfone (PSF, PSU) resins, polyarylate (PAR) resins, allyl diglycol carbonate, cyclic polyolefin (COP, COC) resins, cellulose resins, polyimide (PI) resins, polyamido-imide (PAI) resins, maleimide-olefine resins, polyamide (Pa) resins, acrylic resins, fluoro resins, epoxy resins, silicone resin films, polybenzoxazole resins, episulfide compounds, Liquid Crystal Polymers (LCP), cyanate resins and aromatic ester resins.

Other examples of materials that can be employed include composite plastic materials with silicate particles, composite plastic materials with metal nanoparticle, inorganic oxide nanoparticles and/or inorganic nitride nanoparticles, composite plastic materials with metal or inorganic nanofibers or microfibers, composite plastic materials with carbon fibers or carbon nanotubes, composite plastic materials with glass flakes, glass fibers and/or glass beads, composite plastic materials with particles having a clay mineral or mica crystal structure, layered plastic materials with at least one bonding interface between thin glass and one of the above single organic materials, and barrier functioning composite material with at least one bonding interface from alternately laminating inorganic layers (such as $SiO_2$, $Al_2O_3$, $SiO_xN_y$) with an organic layer formed from one of the above materials, layered metal materials in which stainless steel or stainless steel and another different metal are stacked, aluminum plates, or aluminum plates with oxidized skins on their surface to raise insulating properties by treating the surface with acid (such as by anodic oxidation treatment).

When employing the above organic materials, it is preferable that they have characteristics such as their excellent dimensional stability, solvent resistance, electrical resistance, workability, low conductivity and low moisture absorption.

A bionanofiber composite can also be employed as the support plate material for the photo detector plate 30. A bionanofiber composite is a composite of cellulose microfibril bundles (bacteria cellulose), produced by the bacterium *Acetobacter Xylinum*, and a transparent resin. Cellulose micro-fibril bundles with a width of 50 nm are of a size that is 1/10 that of visible wavelengths, and have high strength, high resilience and low thermal expansion. By impregnating and curing the bacteria cellulose in a transparent resin such as an acrylic resin or an epoxy resin with fibers contained at a proportion of 60% to 70% a bionanofiber composite is obtained with a light transmissivity of 90% to light at 500 nm wavelength. The bionanofiber composite has a low thermal expansion coefficient (3 to 7 ppm/K), comparable to that of crystalline silicon, strength comparable to steel (460 MPa), high resilience (30 GPa) and is also flexible. This enables the photo detector plate 30 to be formed thinner than a configuration such as with a glass plate.

An adhesive layer 70 is provided on the top face of the photo detector plate 30 in order to bond to the scintillator layer 36.

Examples of adhesive materials that may be employed in the adhesive layer 70 include acrylic, rubber and silicone adhesives, however acrylic adhesives are preferably employed from the perspectives transparency and durability.

Examples of such acrylic adhesives preferably employed are copolymers with a principal component such as 2-ethylhexyl acrylate or n-butyl acrylate, together with a short chain alkyl acrylate or methacrylate to raise cohesive force, such as methyl acrylate, ethyl acrylate, methyl methacrylate, and as a cross-linking agent a component such as an acrylate, methacrylate, acryl amide derivative, maleic acid, hydroxyethyl acrylate or gylcidyl acrylate that can become a cross-linking location. The glass transition temperature (Tg) and cross-linking density can be varied by appropriate adjustment to the mixing ratio and types employed for the principal component, short chain component and component added as the cross-linking agent.

The scintillator layer 36 on the top face of the adhesive layer 70 is deposited further to the inside than the outside edges of the vacuum deposition support plate 60, and is similarly located further to the inside than the outside edge of the photo detector plate 30. A gap 72 is thereby formed between the photo detector plate 30 and the vacuum deposition support plate 60.

The scintillator layer 36 is formed in a pillar shaped structure with internally formed gaps, not shown in the drawings. Accordingly, even when the thermal expansion coefficient of the scintillator layer 36 is different to those of the photo detector plate 30 and the vacuum deposition support plate 60, the thermal expansion of the scintillator layer 36 due to temperature fluctuations is of an amount that can be ignored in comparison to that of the photo detector plate 30 and the vacuum deposition support plate 60. Hence reference is only made to the difference between the thermal expansion coefficients of the photo detector plate 30 and the vacuum deposition support plate 60 in the first exemplary embodiment.

The pillar shaped structure of the scintillator layer 36 is configured with a pillar shaped crystal region 36A facing the photo detector plate 30 and formed by plural pillar shaped crystal bodies, and a non-pillar shaped crystal region 36B facing the vacuum deposition support plate 60 that is contiguous to the pillar shaped crystal region 36A and formed by plural non-pillar shaped crystal bodies. The scintillator layer 36 may obviously also be configured by plural pillar shaped bodies alone.

Examples of materials for the scintillator layer 36 include, for example, deliquescent CsI:Tl, CsI:Na (sodium activated cesium iodide) and CsBr. The scintillator layer 36 is configured from at least one material selected therefrom.

Moisture penetration prevention ability becomes necessary due to the scintillator layer 36 being configured from such deliquescent materials. Hence in the first exemplary embodiment of the present invention the side faces of the scintillator layer 36 and the face of the scintillator layer 36 on the adhesive layer 70 side (the bottom face) are covered by a first protection layer 74 with moisture penetration prevention ability.

A material that has barrier functionality to moisture in the atmosphere is employed in the first protection layer 74. Examples of such materials include organic films obtained by gas phase polymerization using a method such as thermal CVD or plasma CVD. Preferably the material is one that deforms resiliently from the perspective of following warping of the photo detector plate 30 and the vacuum deposition support plate 60.

Examples of organic films include, for example, a gas phase polymerized film formed by thermal CVD of a resin made from poly-p-xylylene, or a plasma polymerized film of a fluoro compound containing un-saturated hydrocarbon monomer. A layered structure of both organic and inorganic films can be employed. Preferable examples of inorganic films include silicon nitride (SiNx) films, silicon oxide (SiOx) films, silicon oxy-nitride (SiOxNy) films and $Al_2O_3$.

The vacuum deposition support plate 60 employed when forming (vacuum depositing) the scintillator layer 36 using gas phase deposition is provided at the top face of the scintillator layer 36. The vacuum deposition support plate 60 configures the radiation X irradiated face in the first exemplary embodiment.

Aluminum is preferably employed for example as the material of the vacuum deposition support plate 60 from the perspective of good X-ray permeability and low cost.

However, if the vacuum deposition support plate 60 is configured from a material such as aluminum that is corroded by salts a concern arises as to the reliability with which the scintillator layer 36 can be formed due to corrosion when vacuum depositing the scintillator layer 36 formed from a deliquescent material such as CsI.

Therefore, the vacuum deposition support plate 60 here is covered over all its surfaces by a second protection layer 76 formed from a material similar to that of the first protection layer 74. The second protection layer 76 is also preferably a resilient body similarly to the first protection layer 74.

In the first exemplary embodiment not only are the first protection layer 74 (and the second protection layer 76) provided in order to raise the moisture penetration prevention ability to the scintillator layer 36, but a sealing layer 78 is also provided.

More specifically, the sealing layer 78 is poured into the gap 72 and covers the whole of the side faces of the scintillator layer 36 (or more strictly speaking the first protection layer 74 thereof). The sealing layer 78 is a resilient body film that has a film thickness thinner at the center portion 78A than the film thickness at the vacuum deposition support plate 60 side edges 78B and the photo detector plate 30 side edges 78C. In FIG. 5 the shape of the sealing layer 78 readily resiliently deforms towards the peripheral direction outside and is formed with an outer peripheral face having an indented shape from the perspective of ease of manufacture. More specifically, the sealing layer 78 is shaped such that the thickness of the sealing layer 78 increases as a curve from the center O of the sealing layer 78 towards the vacuum deposition support plate 60 side and the photo detector plate 30 side. In order to form the outer peripheral face of the sealing layer 78 as having an indented shape, the sealing film can be dispensed by a dispenser, for example.

There are no particular limitations to specific values with respect to the film thickness at the center portion 78A of the sealing layer 78 and at the edge portions 78B at the vacuum deposition support plate 60 side and at the edge portions 78C at the photo detector plate 30 side thereof, as long as the thin-thick relationship is achieved. For example, when the thickness of the vacuum deposition support plate 60 configured from aluminum is 500 µm, the thickness of the scintillator layer 36 configured from CsI is 600 µm, the thickness of the adhesive layer 70 is 15 µm and the thickness of the photo detector plate 30 is 700 µm then an example of a suitable thickness at the central portion 78A of the sealing layer 78, especially at the center O where the thickness indicates its minimum value, is 300 µm and suitable film thickness at the side edge portions of the sealing layer 78 at the vacuum deposition support plate 60 side and at the side edge portions of the sealing layer 78 at the photo detector plate 30 side, which is a thickness of side edges of the sealing layer 78 located at the most outside and indicates its maximum value, is 500 µm.

The sealing layer 78 adheres to (is connected to) the first protection layer 74, the second protection layer 76 and the photo detector plate 30 by being poured into the gap 72.

There is no particular limitation to the material of the sealing layer 78 as long as it is a flexible body material. However an adhesive material is preferable, and an acrylic resin or a silicone resin may be employed. The Young's modulus of the resilient body of the sealing layer 78 post curing is preferably between 0.1 MPa and 100 MPa, and more preferably between 0.1 MPa and 3 MPa from the perspective of suppressing separation between the adhered sealing layer 78 and the first protection layer 74 and the second protection layer 76.

Operation

Figure 6A:
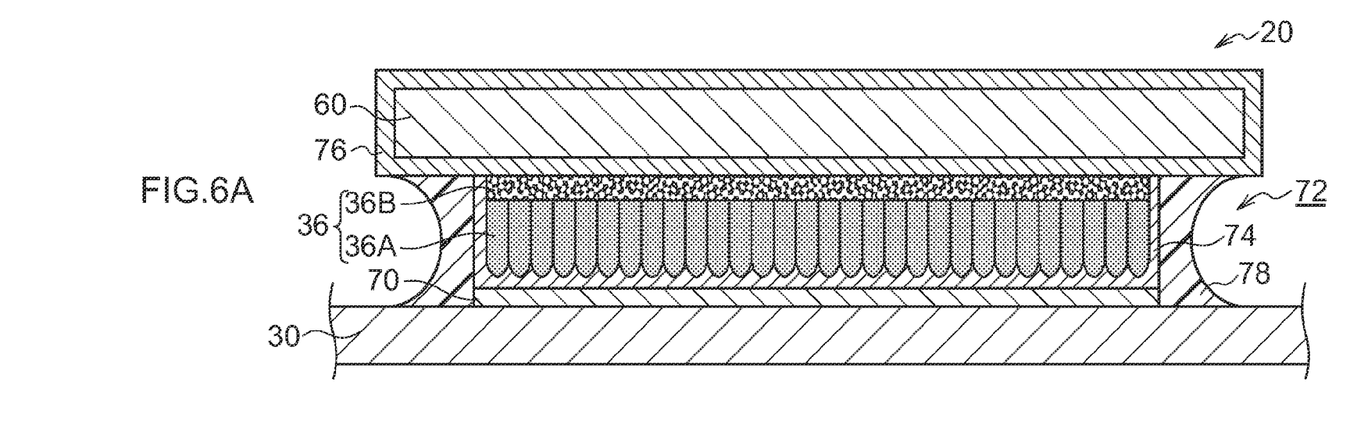
FIG. 6A is an explanatory diagram of operation of a radiation detector according to the first exemplary embodiment of the present invention illustrating the radiation detector in a state prior to thermal expansion.
Figure 6B:
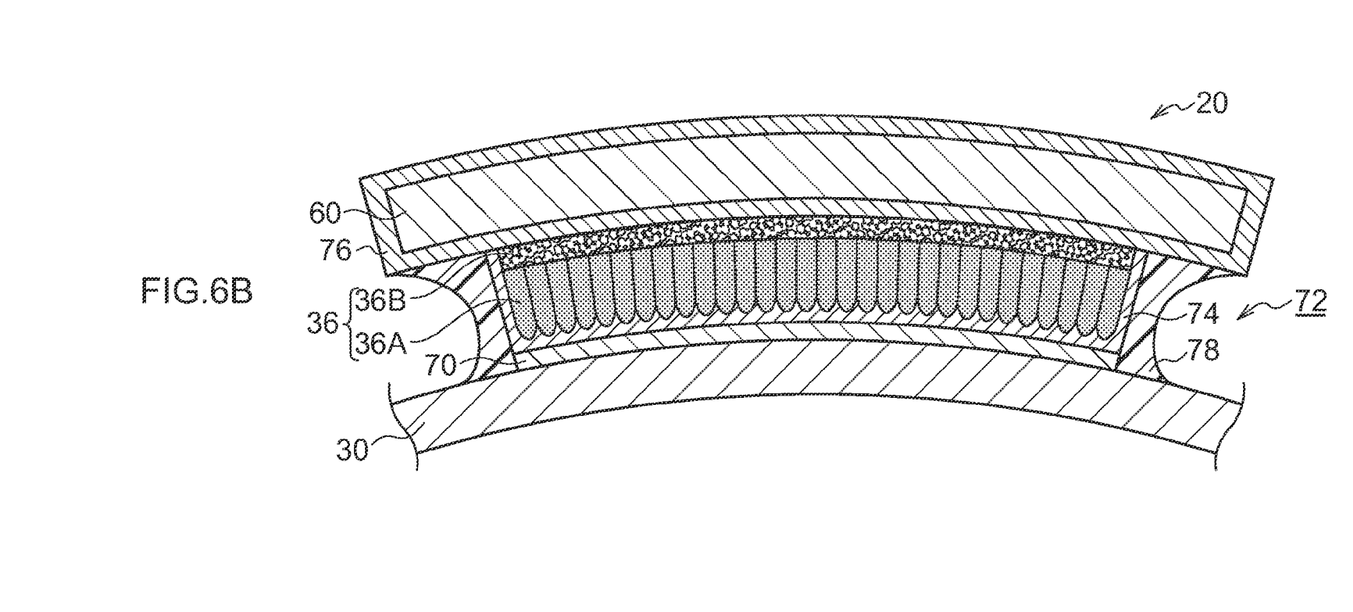
FIG. 6B is an explanatory diagram of operation of a radiation detector according to the first exemplary embodiment of the present invention illustrating the radiation detector in a state after thermal expansion.

Explanation follows regarding operation of the radiation detector 20 according to the first exemplary embodiment of the present invention. FIG. 6A and FIG. 6B are explanatory diagrams of the operation of the radiation detector 20 according to the first exemplary embodiment of the present invention. FIG. 6A illustrates the state of the radiation detector 20 prior to thermal expansion, and FIG. 6B illustrates the state of the radiation detector 20 after thermal expansion has occurred.

As shown in FIG. 6A and FIG. 6B, due to the vacuum deposition support plate 60 and the photo detector plate 30 configuring the radiation detector 20 having different linier expansion coefficients from each other, there is a case that the plates undergo thermal expansion according to changes in the temperature of the electronic cassette 10 and warp towards the outside face directions Z.

However, even when such instances occur, due to the configuration of the radiation detector 20 according to the first exemplary embodiment of the present invention with the film thickness at the center portion 78A of the sealing layer 78 being thinner than the film thickness at the edge portions 78B at the vacuum deposition support plate 60 side and the film thickness at the edge portions 78C at the photo detector plate 30 side, the sealing layer 78 more readily performs resilient deformation, enabling the sealing layer 78 to follow the thermal-expansion-induced warping of the vacuum deposition support plate 60 and the photo detector plate 30 than a case where the thickness at the center of the sealing layer 78 is not thinner.

Due to the film thickness at the edge portions 78B at the vacuum deposition support plate 60 side and the film thickness at the edge portions 78C at the photo detector plate 30 side being thicker than the film thickness at the center, the adhering surface area between the sealing layer 78 and the vacuum deposition support plate 60 side and the photo detector plate 30 side is greater, enabling sufficient cohesive force to be achieved.

Accordingly the sealing layer 78 can be suppressed from separating and other members adhered to the sealing layer 78 (such as the first protection layer 74 and the second protection layer 76) can be suppressed from similar separation that would result in them being exposed from the whole, or a portion, of the side faces of the scintillator layer 36. Consequently, it is possible to maintain the moisture penetration prevention ability to the scintillator layer 36.

Second Exemplary Embodiment

Figure 7:
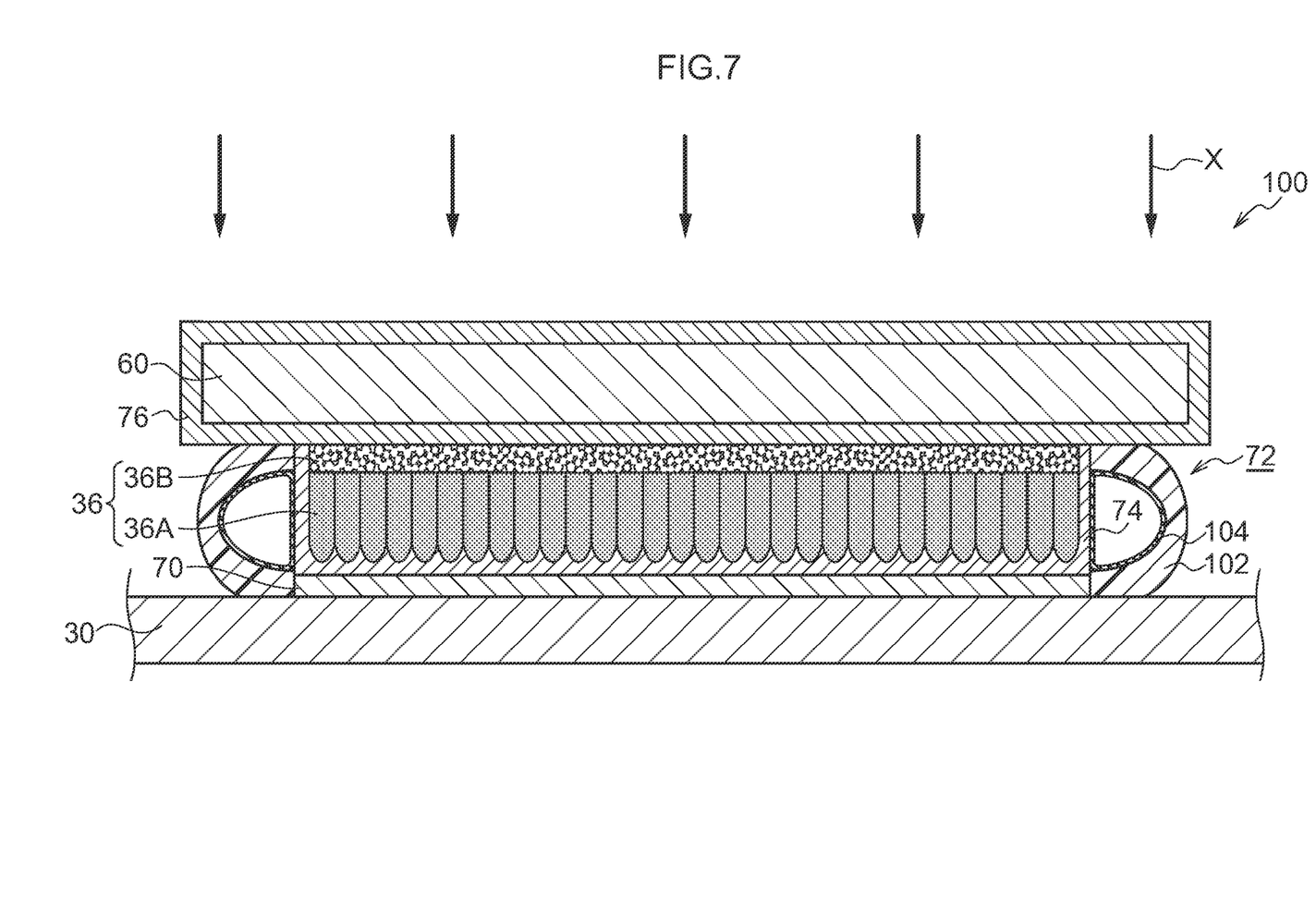
FIG. 7 is a cross-section illustrating a cross-sectional configuration of a radiation detector according to a second exemplary embodiment of the present invention.
Figure 8:
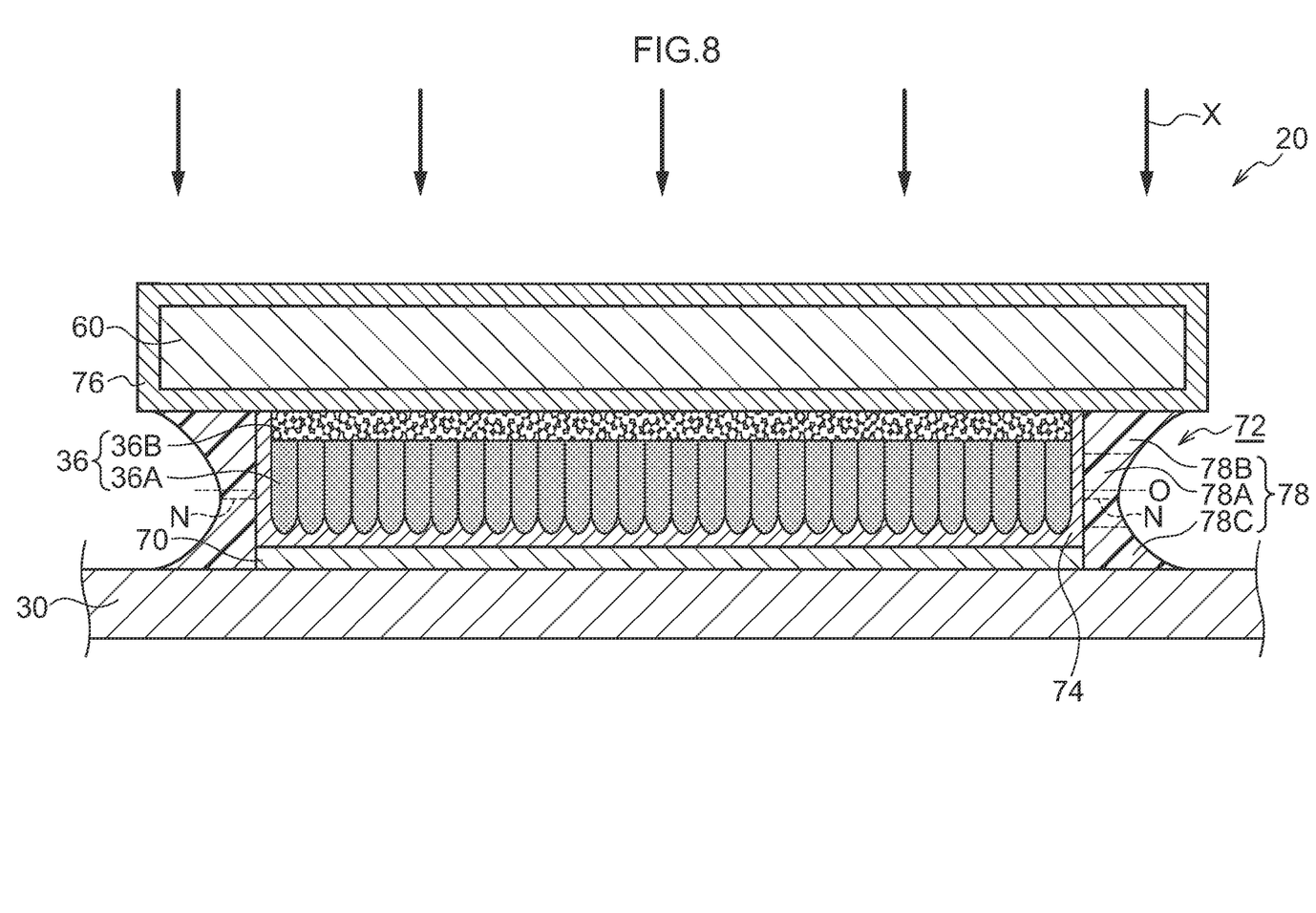
FIG. 8 is a diagram illustrating a modified example of a radiation detector according to the first exemplary embodiment of the present invention.

Explanation follows regarding a radiation detector according to a second exemplary embodiment of the present invention. FIG. 7 is a cross-section illustrating a cross-sectional configuration of a radiation detector 100 according to a second exemplary embodiment of the present invention.

The radiation detector 100 according to a second exemplary embodiment of the present invention has a similar configuration to that of the first exemplary embodiment, but differs therefrom in the profile of the sealing layer 102. Specifically the profile of the sealing layer 78 of the first exemplary embodiment has an indented shape on the outer peripheral surface, however the profile of the sealing layer 102 of the second exemplary embodiment is configured with a projecting profile on the outer peripheral surface. However, the sealing layer 102 in this case is also configured such that the film thickness at the center portion 78A is thinner than the film thickness at the edge portions 78B at the vacuum deposition support plate 60 side and the film thickness at the edge portions 78C at the photo detector plate 30 side.

A tube 104 of a resilient body formed, for example from a silicone resin, is disposed between the scintillator layer 36 and the sealing layer 102 in order to achieve such a profile and film thicknesses for the sealing layer 102.

The Young's modulus of the tube 104 is preferably set lower than the Young's modulus of the sealing layer 102 in order not to impede resilient deformation of the sealing layer 102.

There is no particular limitation to the size of the tube 104, however an example thereof is an external cross-sectional dimension of 500 μm and internal cross-sectional dimension of 400 μm.

The adhering surface area between the side face of the scintillator layer 36 and the sealing layer 102 is reduced by thus disposing the tube 104 between the scintillator layer 36 and the sealing layer 102, and the sealing layer 102 is made more readily deformable. The tube 104 is a resilient body, and so, similarly to the sealing layer 102, is made capable of following any thermal-expansion-induced warping of the vacuum deposition support plate 60 and the photo detector plate 30.

MODIFIED EXAMPLES

Note that while detailed explanation has been given of specific exemplary embodiments of the present exemplary embodiment the present invention is not limited by these exemplary embodiments and it is clear to someone skilled in the art that various other exemplary embodiments are possible within the scope of the present invention. For example, appropriate combinations may be made of elements of the plural above exemplary embodiments. Appropriate combinations may also be made with the following modified examples.

For example, while explanation has been given of cases in which the scintillator layer 36 of the first exemplary embodiment has a pillar shaped structure, a pillar shaped structure is not essential as long as the scintillator layer 36 is configured with two components having different linear expansion coefficients from each other.

Similarly, while explanation has been given of cases in which the scintillator layer 36 in the first exemplary embodiment is configured from a deliquescent material it is not essential for the scintillator layer 36 to be configured from a deliquescent material as long as there is a need for moisture penetration prevention ability to the scintillator layer 36.

Configuration may also be made omitting the first protection layer 74 and/or the second protection layer 76.

Furthermore, while explanation has been given of cases in which the sealing layer 78 in the first exemplary embodiment covers the whole of the side faces of the scintillator layer 36 configuration may be made such that the sealing layer 78 covers at least a portion of the side faces of the scintillator layer 36, and configured such that the profile of other parts of the side faces are covered normally by a sealing layer (such that the film thickness at the internal face direction is the same at the center portion 78A and at the two edge portions 78B, 78C along the outside face directions Z).

Figure 9:
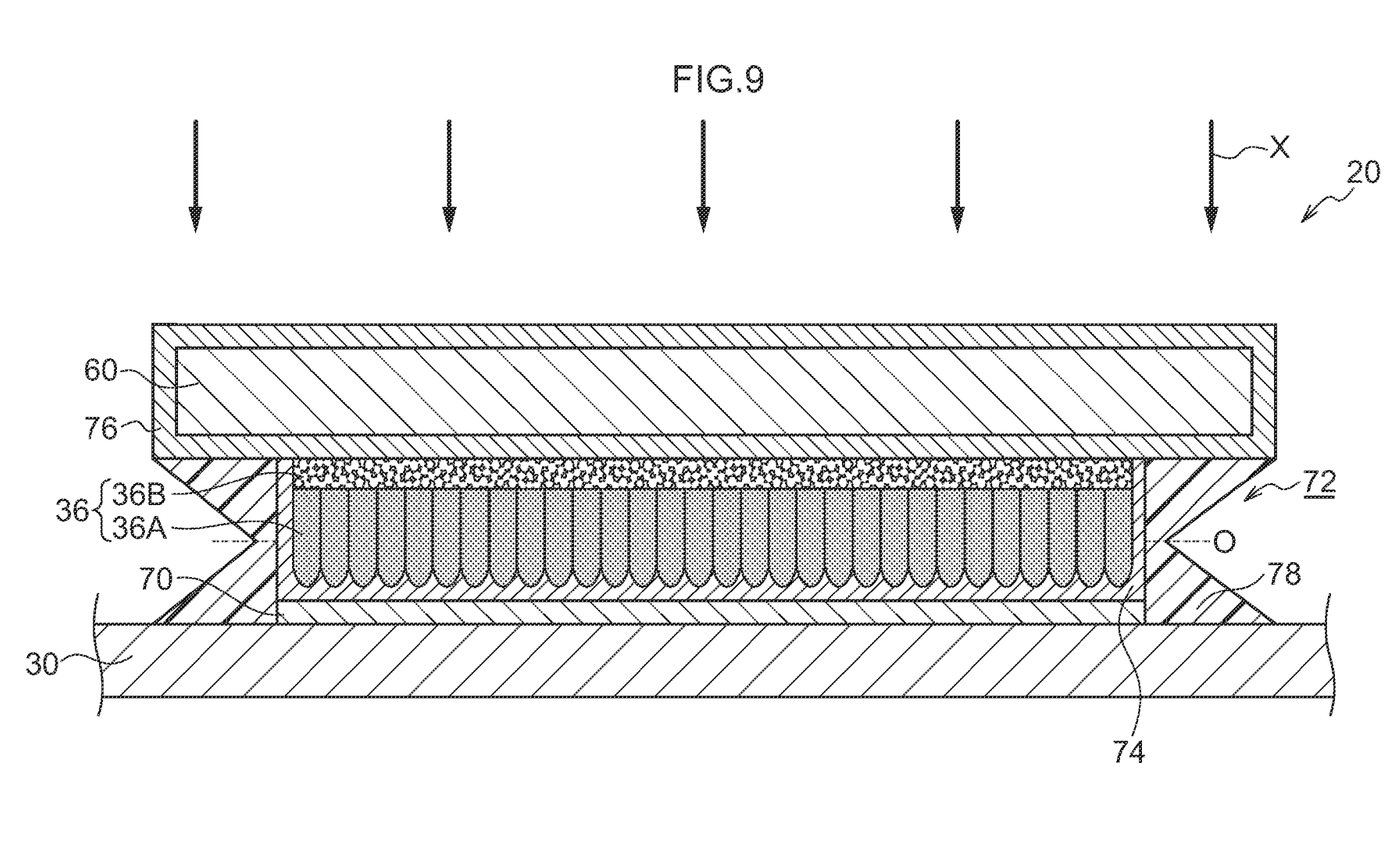
FIG. 9 is a diagram illustrating an another modified example of a radiation detector according to the first exemplary embodiment of the present invention.

A case in which the thickness of the sealing layer 78 indicates its minimum value at the center portion 78A, especially at the center O, was described above. However, as seen in FIG. 9, a portion N of the sealing layer 78 where the thickness thereof indicates its minimum value at the center portion 78A may be shifted from the center O towards the vacuum deposition support plate 60 side or the photo detector plate 30 side.

Further, a case, in which the thickness of the sealing layer 78 increases as a curve from the center O towards the vacuum deposition support plate 60 side and the photo detector plate 30 side, was described above with reference to FIG. 5. However, for example, as seen in FIG. 9, the sealing layer 78 may be shaped such that the thickness of the sealing layer 78 increases linearly from the center O towards the vacuum deposition support plate 60 side or the photo detector plate 30 side.

Figure 10:
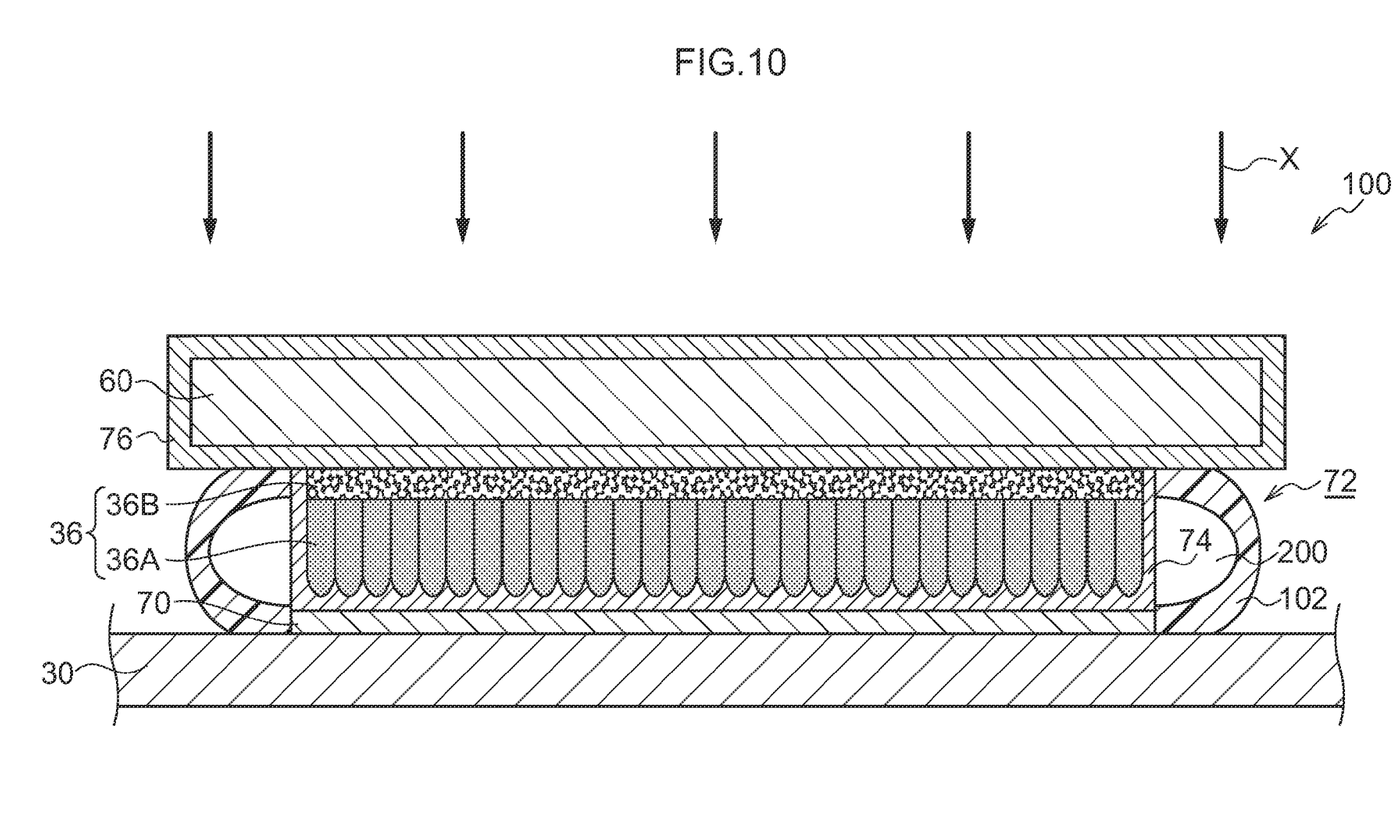
FIG. 10 is a diagram illustrating a modified example of a radiation detector according to the second exemplary embodiment of the present invention.

Furthermore, while explanation has been given of cases in which the resilient body tube 104 configured from a material such as silicone resin is disposed between the scintillator layer 36 and the sealing layer 102 in the second exemplary embodiment, the tube 104 may be omitted, as shown in FIG. 10, if an air layer 200 can be disposed between the scintillator layer 36 and the sealing layer 102 in place of the tube 104 by manipulation during manufacture.

Furthermore, while explanation has been given in the first and second exemplary embodiments of cases that include what is referred to as a front-face-irradiation electronic cassette 10 in which the vacuum deposition support plate 60 side is the irradiation face for the radiation X, configuration may be made with what is referred so as a back-face-irradiation electronic cassette 10 in which the irradiation face for the radiation X is the photo detector plate 30 side.

Whereas in the first exemplary embodiment explanation has been given of cases of sequential provision inside the casing 16, from the irradiation face 18 side of the casing 16 onto which the radiation X is irradiated, of the radiation detector 20 for detecting radiation X that has passed through the patient 14 and the control board 22, configuration may be made with a grid for removing scattered radiation of radiation X arising on passing through the patient 14, the radiation detector 20, and then a lead plate for absorbing back scattered radiation of the radiation X provided sequentially from the irradiation face 18 onto which the radiation X is irradiated.

In the first exemplary embodiment explanation has been given of cases in which the shape of the casing 16 is that of a rectangular flat plate, however there is no particular limitation thereto and the casing 16 may be shaped as a square or circular shape in plan view, for example.

In the first exemplary embodiment explanation has been given of cases in which there is a single control board 22, however there present exemplary embodiment is not limited so such an exemplary embodiment, and configuration may be made with the control board 22 split into plural control boards 22 with one for each function. Furthermore, in the explanation the control board 22 is disposed alongside the radiation detector 20 in the vertical direction (the thickness direction of the casing 16), however configuration may be made with the control board 22 disposed alongside the radiation detector 20 in the horizontal direction.

Radiation X is also not limited to X-rays, and other radiation such as α-rays, β-rays, γ-rays, an electron beam or ultraviolet radiation may be employed.

Explanation has been given of cases in which the electronic cassette 10 is a portable electronic cassette, however the radiographic imaging apparatus may be a large scale, non-portable radiographic imaging apparatus.

EXAMPLES

Explanation follows regarding Examples of the radiation detector of the present exemplary embodiment.

Five of the radiation detectors 20 illustrated in FIG. 5 and explained in the first exemplary embodiment are produced as Examples while varying the Young's modulus of the sealing layer 78. In the produced radiation detectors 20 the vacuum deposition support plate 60 is configured by aluminum and its thickness is 500 μm. Further, the scintillator layer 36 is configured from CsI and its thickness is 600 μm. The thickness of the adhesive layer 70 is 15 μm. The first protection layer 74 is configured from parylene (p-xylylene resin) and its thickness is 20 μm. Further, similarly to the first protection layer 74, the second protection layer 76 is configures from parylene (p-xylylene resin) and its thickness is 10 μm.

The photo detector plate 30 is configured from a TFT substrate, which is made from non-alkali glass and which includes a photodiode, and the thickness of the photo detector plate 30 is 700 μm. The sealing layer 78 of each of the radiation detectors 20 is configured from TB3017B, which is an acrylic resin produced by Three Bond corporation and has a Young's modulus of 2.4 MPa, U471B, which is an acrylic resin produced by Chemi-tech corporation and has a Young's modulus of 0.4 MPa, A1656C, which is an acrylic resin produced by Tesk corporation and has a Young's modulus of 1.3 MPa, KE347, which is a silicon resin produced by Shin-Etsu Chemical corporation and has a Young's modulus of 0.7 MPa, and TB2088E, which is an epoxy resin produced by Three Bond corporation and has a Young's modulus of 625 MPa, respectively. Further, the thickness at the center O of the sealing layer 78 is 300 μm, and the film thickness of the edge portions at the vacuum deposition support plate 60 side and the photo detector plate 30 side is 500 μm. The sealing layer 78 is formed by dispensing the above described materials by a dispenser.

Figure 11:
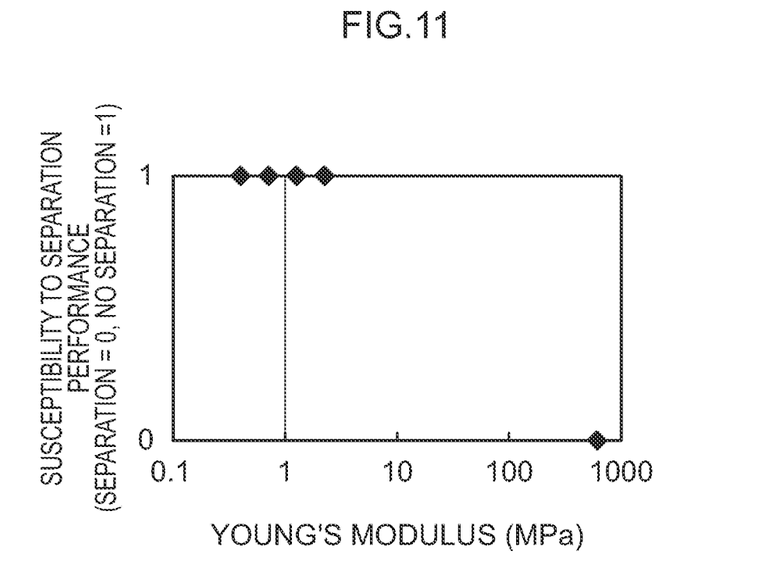
FIG. 11 is a graph illustrating the relationship between Young's modulus of a sealing layer after leaving each radiation detector manufactured in Examples of the present invention to stand for 16 hours at 50° C. and separation performance to a second protection layer.

FIG. 11 shows a logarithmic graph of the relationship between the Young's modulus of the sealing layer 78 after leaving each of the radiation detectors 20 of the above configuration to stand at a temperature of 50° C. and the separation performance of the second protection layer 76.

It can be confirmed from the separation results that no separation of the second protection layer 76 occurs in the range from 0.1 MPa to 3 MPa.

However, these separation results under to above conditions are merely examples, and the Young's modulus of the sealing layer of the present invention is not limited to the range from 0.1 MPa to 3 MPa.

What is claimed is:

1. A radiation detector comprising:
   a support body;
   a scintillator layer that is deposited further to the inside than outside edges of the support body and that converts incident radiation into light;
   a photo detector plate that converts light emitted from the scintillator layer into charge and has a different linear expansion coefficient to that of the support body, the photo detector plate being adhered to the scintillator layer so as to form a gap between the photo detector plate and the support body; and
   a sealing layer of a resilient body that is poured into the gap and that adheres to a whole of a side face of at least one of: the scintillator layer and a protection layer of the scintillator layer, at least one of the side face of the scintillator and the side face of the protection layer being flat, such that a film thickness at the center portion of the sealing layer is thinner than a film thickness of the sealing layer at the support body side edges and at the photo detector plate side edges.

2. The radiation detector of claim 1, wherein the protection layer comprises a first protection layer provided between the side face of the scintillator layer and the sealing layer.

3. The radiation detector of claim 2, wherein:
   the scintillator layer has a pillar shaped structure; and
   all surfaces of the support body are covered by a second protection layer.

4. The radiation detector of claim 3, wherein a post curing Young's modulus of the resilient body is from 0.1 MPa to 100 MPa.

5. The radiation detector of claim 3, wherein the second protection layer is configured from material that deforms resiliently.

6. The radiation detector of claim 3, wherein the first protection layer and the second protection layer are formed from a same material.

7. The radiation detector of claim 3, wherein the sealing layer adheres to the first protection layer, the second protection layer and the photo detector plate, respectively.

8. The radiation detector of claim 2, wherein the first protection layer is configured from material that deforms resiliently.

9. The radiation detector of claim 2, wherein the first protection layer comprises poly-p-xylylene.

10. The radiation detector of claim 1, wherein an outer peripheral face of the sealing layer has an indented profile.

11. The radiation detector of claim 1, further comprising an adhesive layer provided on a top face of the photo detector plate in order to bond the photo detector plate to the scintillator layer, wherein the adhesive layer comprises acrylic adhesive material.

12. The radiation detector of claim 1, wherein the scintillator layer is located further to the inside than the outside edge of the photo detector plate.

13. The radiation detector of claim 1, wherein the scintillator layer is configured from deliquescent material.

14. The radiation detector of claim 1, wherein the sealing layer comprises a resilient body film.

15. The radiation detector of claim 1, wherein the sealing layer comprises an adhesive material.

16. The radiation detector of claim 1, wherein the sealing layer comprises an acrylic resin or a silicone resin.

17. A radiation detector comprising:
   a support body;
   a scintillator layer that is deposited further to the inside than outside edges of the support body and that converts incident radiation into light;
   a photo detector plate that converts light emitted from the scintillator layer into charge and has a different linear expansion coefficient to that of the support body, the photo detector plate being adhered to the scintillator layer so as to form a gap between the photo detector plate and the support body;
   a sealing layer of a resilient body that is poured into the gap and that covers a side face of the scintillator layer, such that a film thickness at the center portion of the sealing layer is thinner than a film thickness of the sealing layer at the support body side edges and at the photo detector plate side edges; and, further comprising a tube that is made of a resilient body and disposed between the scintillator layer and the sealing layer.

18. The radiation detector of claim 17, wherein the tube comprises a resilient body film.

19. The radiation detector of claim 17, wherein a Young's modulus of the tube is lower than the Young's modulus of the sealing layer.

* * * * *